United States Patent
Hunter et al.

(10) Patent No.: US 7,819,385 B2
(45) Date of Patent: Oct. 26, 2010

(54) HIGH ASPECT RATIO THREADFORM

(75) Inventors: Rick C. Hunter, Friendswood, TX (US); Anh D. Nguyen, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 226 days.

(21) Appl. No.: 11/834,349

(22) Filed: Aug. 6, 2007

(65) Prior Publication Data
US 2008/0029728 A1 Feb. 7, 2008

Related U.S. Application Data

(60) Provisional application No. 60/835,600, filed on Aug. 4, 2006.

(51) Int. Cl.
*F16K 31/44* (2006.01)
(52) U.S. Cl. .................. 251/264; 251/326; 74/89.23; 74/424.75; 411/366.1; 411/411
(58) Field of Classification Search .............. 251/264, 251/326, 327; 74/424.75, 89.23; 411/366.1, 411/411
See application file for complete search history.

(56) References Cited

U.S. PATENT DOCUMENTS

| | | | | |
|---|---|---|---|---|
| 1,557,926 A * | 10/1925 | Dopp | .......................... | 251/266 |
| 1,789,878 A * | 1/1931 | Mueller | ........................ | 137/560 |
| 2,091,745 A * | 8/1937 | Webb | .......................... | 251/222 |
| 2,426,392 A * | 8/1947 | Fennema | ..................... | 220/240 |
| 2,943,508 A | 7/1960 | Musser | | |
| 3,349,789 A * | 10/1967 | Crain et al. | ............. | 137/246.22 |
| 3,662,778 A * | 5/1972 | Leopold et al. | ............. | 137/375 |
| 4,106,359 A * | 8/1978 | Wolfe et al. | .............. | 74/424.75 |
| 4,106,747 A | 8/1978 | Malacheski et al. | | |
| 4,189,975 A | 2/1980 | Masumoto | | |
| 4,223,868 A * | 9/1980 | Humes et al. | ................ | 251/326 |
| 4,532,957 A * | 8/1985 | Battle et al. | .................. | 137/375 |
| 4,753,124 A * | 6/1988 | Chevance | .............. | 74/501.5 R |
| 4,760,635 A * | 8/1988 | Miller | .......................... | 29/558 |
| 4,790,203 A * | 12/1988 | Brandenstein et al. | ..... | 74/89.36 |
| 5,239,882 A * | 8/1993 | Druet | ...................... | 74/424.75 |
| 5,620,166 A | 4/1997 | Lord et al. | | |
| 5,816,104 A * | 10/1998 | Sugita et al. | ................ | 74/89.43 |
| 5,992,440 A | 11/1999 | Betz | | |
| 6,726,420 B2 * | 4/2004 | Ward et al. | ................... | 411/436 |
| 2003/0116742 A1 * | 6/2003 | Anderson et al. | ........... | 251/326 |

FOREIGN PATENT DOCUMENTS

| | | |
|---|---|---|
| GB | 1155055 A | 6/1969 |
| GB | 2361725 A | 10/2001 |
| GB | 2397312 A | 7/2004 |

* cited by examiner

*Primary Examiner*—John Bastianelli
(74) *Attorney, Agent, or Firm*—Bracewell & Giuliani

(57) ABSTRACT

A threadform for a gate valve has a set of threads on a stem that engage a threaded receptacle of the gate. When the stem is rotated, the gate moves. The threads have a thread height to thread base thickness ratio that is at least the inverse of 0.7 times e raised to 0.388 divided by a nominal thread diameter of the threads. That ratio is at least 1.1.

10 Claims, 2 Drawing Sheets

HIGH ASPECT RATIO THREADFORM

CROSS-REFERENCE TO RELATED APPLICATION

This application claims priority to provisional application 60/835,600, filed Aug. 4, 2006.

FIELD OF THE INVENTION

This invention relates in general to threadforms, and in particular to threadform for a gate valve stem, the threads having a high aspect ratio and consequently higher efficiency.

DESCRIPTION OF THE PRIOR ART

A variety of equipment or tools used in oil field drilling and production have threaded members that rotate relative to each other while under a load. For example, gate valves are often used for oil and gas production control equipment. A gate valve has a body with a cavity. A flow passage intersects the cavity. A gate is moved between open and closed positions relative to the flow passages. The gate valve has to be able to move from a closed position to an open position while under the pressure of the flowline, which may be quite high.

The gate is moved by a stem, which may be either a rising stem or non-rising stem. A rising stem moves axially as it rotates. With a non-rising type, the stem remains axially stationary while being rotated. The stem is threaded in both types and typically reacts against a threaded nut or a drive bushing. The flowline pressure forces the gate tightly against the seat. Frictional forces at this interface must be overcome in order to move the gate from the closed to the open position.

The valve stem must be designed to withstand high axial and torsional loads. It is more challenging for the stem to withstand the loads for larger and higher pressures. A 9 inch bore, 20,000 psi gate valve used for drilling and producing deep gas hydrocarbon reservoirs is an example of a valve that must meet these challenges.

A variety of thread forms have been utilized in the prior art for valve stems and other threadforms under high loads when rotated against each other. In one type, the threads appear in cross-section as frusto-conical shapes, with flat crest and flat roots between the crest. This type of thread, referred to as a modified ACME, is typically hardened and then coated with a dry lubricant.

The modified ACME thread has worked well but under high pressure, the thread undergoes non-uniform contact pressure between the flanks of threads of the drive bushing and the stem. The non-uniform contact pressure overloads the surface treatments and lubricants, resulting in inefficiency and occasionally galling. This is particularly a problem with higher pressure and larger bore valves.

In the prior art, stem and drive bushing threads were designed to have shear strengths that matched the tensile strengths of the stem and drive bushing. The tensile strength of the stem is a function of its diameter, and when the diameter is made larger, the thread bearing area also increases because of the larger diameter. The thread bearing area is the contacting surfaces between threads. In the prior art, the thread profile for thread forms for valve stems were essentially fixed in height or radial dimension, and did not change with an increase or decrease in the diameter of the valve stem. As a result, even though the thread bearing area would increase with an increase in thread diameter, it would not increase at the same rate. The thread bearing stress can more than double when going from a stem diameter of 0.5" to 2.0".

This analysis is based on a threadform axial engagement length equal to one diameter of the stem, which is a typical industry guideline. Making the thread engagement length longer does not really increase the thread bearing area because the threads along the length of the stem do not load up evenly. Additional threads along the length of the valve stem may be of essentially no benefit.

SUMMARY OF THE INVENTION

The thread form of this invention is configured to reduce contact stress by using a high aspect ratio. That is, the threads have a ratio of thread height over the thread base thickness, referred to herein as thread pitch, that is higher than in the known prior art for high load threadforms. The threads are formed with a thread Th over thread pitch Tpitch that is at least equal to the following equation:

$$R = (0.7 * e(0.388/\text{Td}))^{-1}$$

Preferably this ratio comprises at least 1.1.

Preferably the threads are of triangular configuration, each having a rounded crest and rounded root. Preferably, the threads have between them an included angle less than 50 degrees.

The thread stiffness is designed so as to provide flexibility and greater contact area. By maintaining a high thread aspect ratio to the above relationship, the threads will flex so that flank to flank contact emanates from the midpoint of the flanks, rather than on the edges of the flanks. Finite element analyses have shown that this thread flexibility reduces the peak bearing stress on the thread flanks by a factor as high as 5.0. Consequently, by minimizing the peak bearing stresses, the stem thread surface treatments designed to minimize galling and reduce friction, can survive. Testing has shown that thread efficiencies as high as 50% can be achieved with this thread.

DETAILED DESCRIPTION OF THE INVENTION

Figure 1:
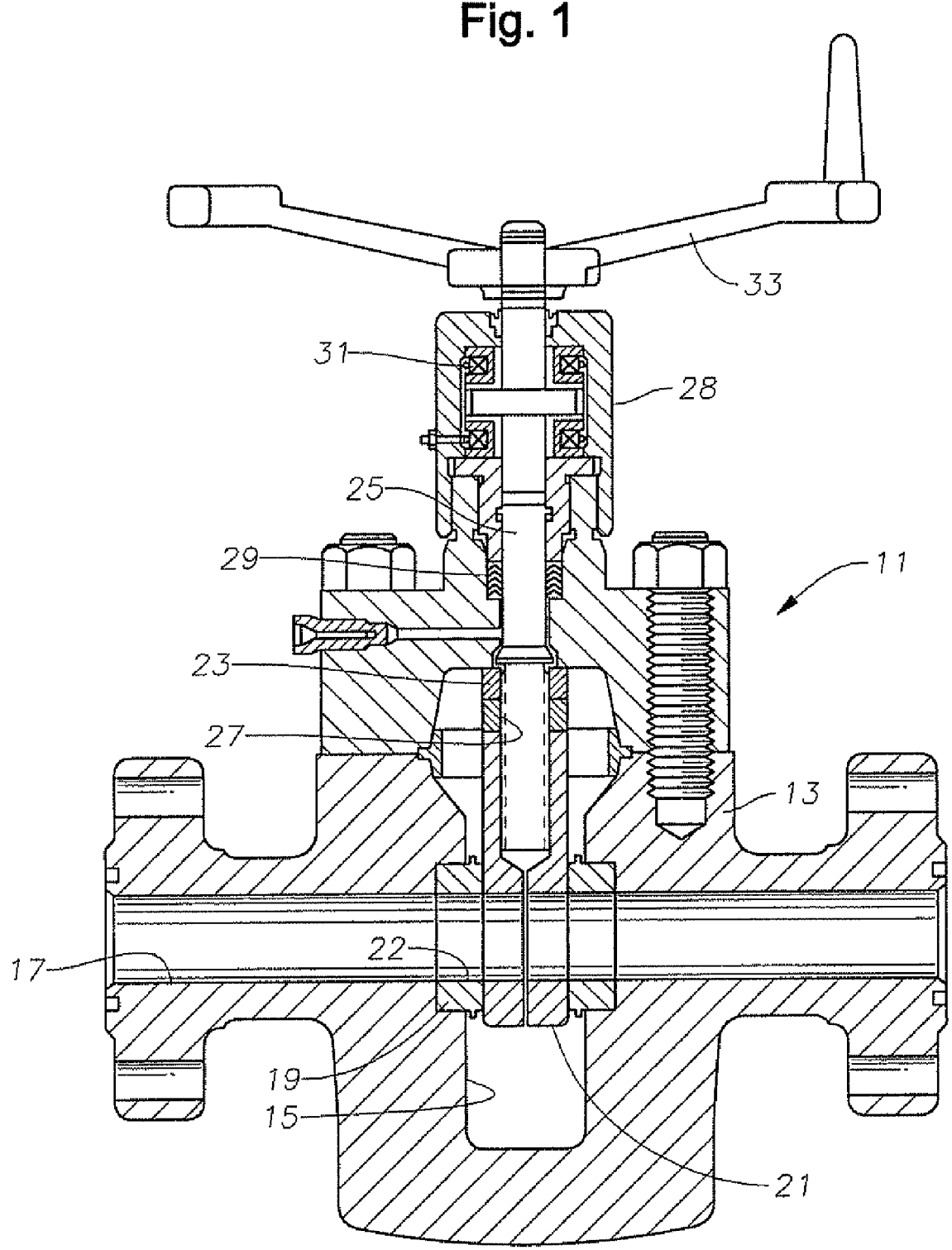
FIG. 1 is a sectional view of a gate valve having a stem threadform in accordance with this invention.

Referring to FIG. 1, valve 11 has a body 13 containing a cavity 15. A flow passage 17 intersects cavity 15. A valve seat 19 is located at the intersection of each portion of flow passage 17 with cavity 15. A gate 21 having a hole 22 through it moves from an open position shown in FIG. 1 to a closed position. In this embodiment, when in a closed position, gate 21 is located lower within the cavity so that portions of gate 21 block flow through passage 17. Gate 21 is shown as a split gate, having two separate slabs. Alternately, gate 21 could have a single slab.

Gate 21 has a drive bushing 23 that is engaged by a stem 25. Stem 25 extends out of cavity 15 and has stem threads 27 that engage mating threads in drive bushing 23. Stem 25 is shown to be a non-rising type; when rotated, it remains axially stationary and causes translational movement of gate 21 between open and closed positions. Alternately, stem 25 could be a rising type.

Stem 25 extends out of a valve bonnet 28 that is secured to body 13. Bonnet 28 contains a stem packing 29 to seal against pressure, and bearings 31 to reduce friction. In this embodiment, a handle 33 is shown for rotating stem 25. In many cases, an actuator will be employed to cause rotation of stem 25, the actuator either being hydraulically or electrically driven.

Figure 2:
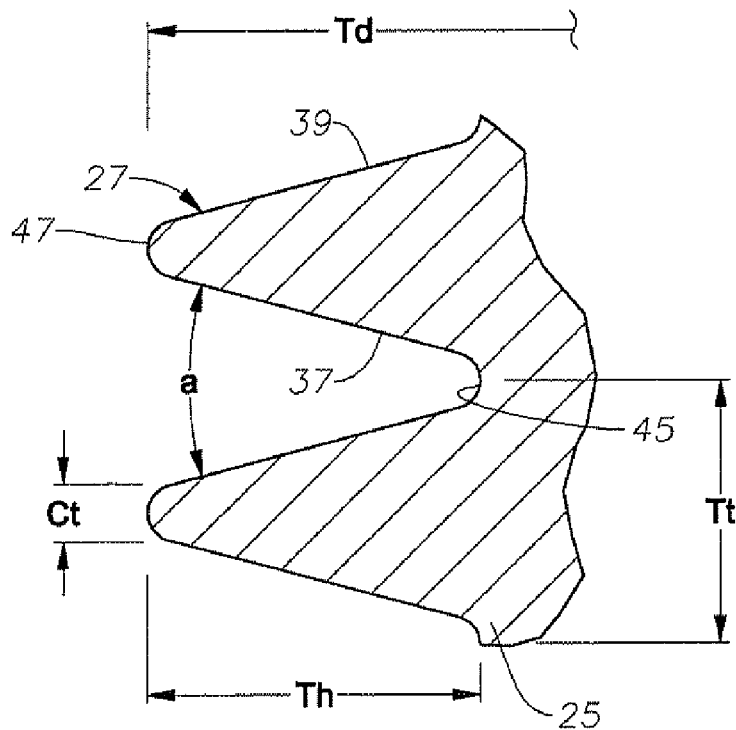
FIG. 2 is an enlarged sectional view of a portion of the threads of the valve stem of the gate valve of FIG. 1.
Figure 3:
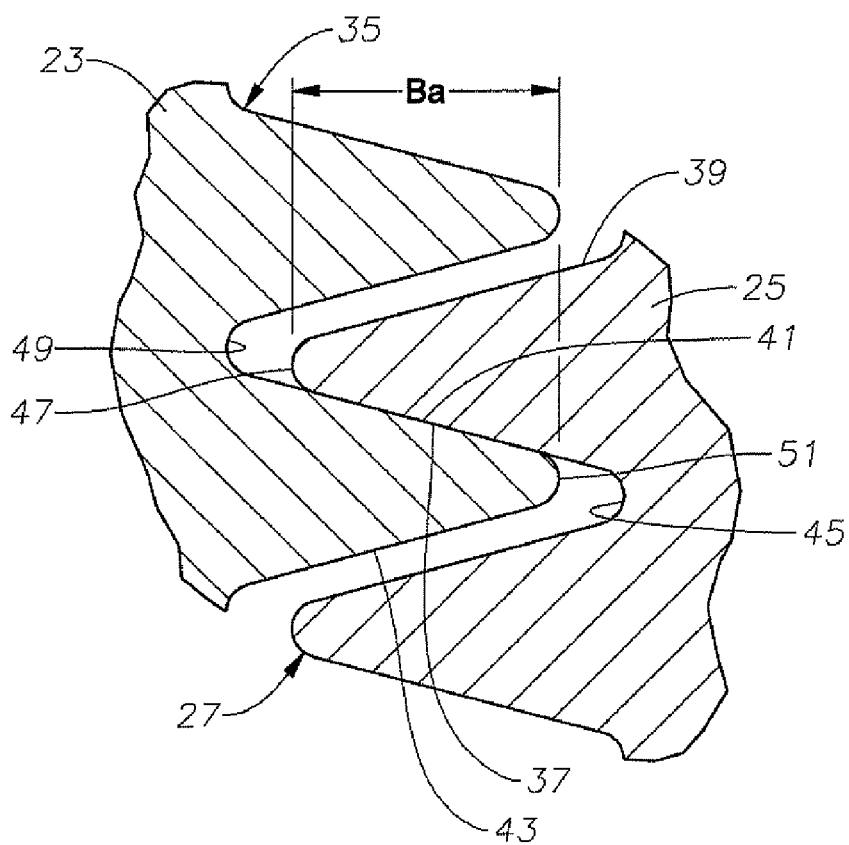
FIG. 3 is an enlarged sectional view of the valve stem threads of FIG. 2, shown engaging the drive bushing threads of the gate valve of FIG. 1.

Referring to FIGS. 2 and 3, stem threads 27 engage bushing threads 35 that are identical in configuration. Threads 27, 35 may have two or more starts. Each stem thread 27 has a load flank 37 and an unloaded flank 39. Flanks 37, 39 have an included angle a between them that is preferably no more than 50 degrees. In one example, included angle a is approximately 29 degrees.

Stem load flank 37 engages a bushing load flank 41 to prevent bushing 23 from moving axially out of cavity 15 (FIG. 1) in response to pressure. Stem unloaded flank 39 is normally spaced from bushing unloaded flank 43 by a clearance as shown in FIG. 3, when valve 11 is under pressure.

Each stem thread 27 has a stem root 45 separating it from an adjacent stem thread 27. Root 45 is rounded, formed at a radius in this embodiment. Also, each stem thread 27 has a stem crest 47 that is a reverse image of stem root 45. Stem crest 47 is also rounded, formed at a single radius.

Each bushing thread 35 has a bushing root 49 that is identical to stem root 45. Each bushing thread 35 has a bushing crest 51 that is identical to stem crest 47. While in the loaded position under pressure, shown in FIG. 3, bushing root 49 is spaced from stem crest 47 by a clearance. This results in a thread bearing area Ba (FIG. 3).

Stem threads 27 have an aspect ratio much higher than any known prior art for high pressure gate valve stem threads. The aspect ratio is defined as height Th divided by the thread pitch Tpitch of thread 27 at its base. In this example, the thread thickness Tt at its base is equal to the pitch, which is the axial distance between two adjoining threads 27. The height Th of the threads is measured from root 45 to crest 47. This measurement is radial or perpendicular to the measurement of thickness Tt. In the preferred embodiment, the ratio R of thread height Th over the thread pitch Tpitch is at least equal to the following equation:

$$R = (0.7 * e(0.388/Td))^{-1}$$

Stated in another manner, the ratio R is at least equal to the inverse of 0.7 times the exponent e raised to of 0.388 divided by a nominal thread diameter of the threads. The thread diameter Td is measured from crest 47 on one side to crest 47 at a point 180 degrees away.

This high aspect ratio relationship was derived to provide more flexibility in thread 27 to reduce the contact pressure in bearing area Ba and distribute the load more uniformly. This relationship results in a ratio that is at least 1.1 for the smallest diameter anticipated for valve stem 27, which is 0.5". Larger valve stems will not exceed the value of 1.7 in the preferred embodiment.

Threads 27, 35 are designed for the capability of being rotated in high load applications. The contact pressure of threads 27, 35 is less than in one prior art gate valve. The thread bearing area Ba for each thread 27, 35 is greater than the thread bearing area Ba for the prior art modified ACME threadform.

The invention has significant advantages. The high aspect ratio for the threads makes them more flexible, which reduces both the contact pressure on the thread flanks and distributes the load more uniformly over the flanks. Further, the increased thread flexibility helps to distribute the load among the total threads engaged. Also, the high aspect ratio increases the contact area of the threads, further reducing the contact stress. The reduction in stress reduces the chance of wearing away of friction coatings and reduces the possibility of galling.

While the invention has been shown in only one of its forms, it should be apparent to those skilled in the art that it is not so limited but is susceptible to various changes without departing from the scope of the invention.

We claim:

1. In a gate valve having a stem with a set of threads that engage a bushing connected with a gate, so that rotation of the stem moves the gate relative to valve seats, the threads of the stem and bushing comprising:
    a threadform wherein a thread height to thread pitch ratio R is at least the following:

$$R = (0.7 * e(0.388/Td))^{-1}$$

where Td is the thread diameter.

2. The gate valve according to claim 1, wherein the ratio comprises at least 1.1.

3. The gate valve according to claim 1, wherein each of the threads has a rounded crest.

4. The gate valve according to claim 1, wherein the threads have an included thread angle of less than 50 degrees.

5. In a gate valve having a stem with a set of threads that engage a bushing connected with a gate, so that rotation of the stem moves the gate relative to valve seats, the threads of the stem and bushing comprising:
    a threadform wherein a thread height to a thread pitch ratio R is at least the following:

$$R = (0.7 * e(0.388/Td))^{-1}$$

where Td is the thread diameter; and
    wherein the thread height to the thread pitch ratio R for each of the threads is at least 1.1.

6. The gate valve according to claim 5, wherein each of the threads has a rounded crest.

7. The gate valve according to claim 5, wherein the threads have an included thread angle of less than 50degrees.

8. In a gate valve having a stem with a set of threads that engage a bushing connected with a gate, so that rotation of the stem moves the gate relative to valve seats, the threads of the stem and bushing comprising:
    a threadform with at least two starts and a thread height to thread pitch ratio R that is at least the following:

$$R = (0.7 * e(0.388/Td))^{-1}$$

where Td is the thread diameter;
    wherein each of the threads has a rounded crest;
    the threads have an included thread angle of less than 50 degrees; and
    the thread pitch is equal to a thickness of each of the threads at a base of each of the threads.

9. The gate valve according to claim 1 wherein the thread pitch is equal to a thickness of each of the threads at a base of each of the threads.

10. The gate valve according to claim 5 wherein the thread pitch is equal to a thickness of each of the threads at a base of each of the threads.

* * * * *